US012616089B2

(12) United States Patent
Wei et al.

(10) Patent No.: US 12,616,089 B2
(45) Date of Patent: May 5, 2026

(54) CUTTING DECK LIFTING DEVICE AND MOWER HAVING CUTTING DECK LIFTING DEVICE

(71) Applicant: Greenworks (Jiangsu) Co., Ltd, Changzhou (CN)

(72) Inventors: Qunli Wei, Changzhou (CN); Xiaolei Qiu, Changzhou (CN); Qin Ji, Changzhou (CN); Dongdong Shi, Changzhou (CN)

(73) Assignee: Greenworks (Jiangsu) Co., Ltd, Changzhou (CN)

( * ) Notice: Subject to any disclaimer, the term of this patent is extended or adjusted under 35 U.S.C. 154(b) by 279 days.

(21) Appl. No.: 18/516,933

(22) Filed: Nov. 21, 2023

(65) Prior Publication Data

US 2024/0081179 A1      Mar. 14, 2024

Related U.S. Application Data

(63) Continuation of application No. 17/023,934, filed on Sep. 17, 2020, now Pat. No. 11,856,886.

(30) Foreign Application Priority Data

Sep. 17, 2019    (CN) .......................... 201910874473.7

(51) Int. Cl.
*A01D 34/74*          (2006.01)
*A01D 101/00*        (2006.01)

(52) U.S. Cl.
CPC .......... *A01D 34/74* (2013.01); *A01D 2101/00* (2013.01)

(58) Field of Classification Search
CPC ...................................................... A01D 34/74
See application file for complete search history.

(56) References Cited

U.S. PATENT DOCUMENTS

| | | | |
|---|---|---|---|
| 6,837,032 B1 * | 1/2005 | Swartzendruber ..... | A01D 34/64 56/14.9 |
| 9,445,543 B2 * | 9/2016 | Berglund ............... | A01D 34/74 |
| 11,071,248 B1 * | 7/2021 | Funk ..................... | A01D 34/661 |
| 2002/0088217 A1 * | 7/2002 | Dennis ................... | A01D 34/74 56/15.8 |
| 2008/0229725 A1 * | 9/2008 | Shaffer .................. | A01D 34/74 56/17.1 |
| 2014/0260162 A1 * | 9/2014 | Lancaster ............ | A01D 34/006 56/17.1 |
| 2019/0373798 A1 * | 12/2019 | Walsh .................... | A01D 75/00 |

* cited by examiner

*Primary Examiner* — Joseph M Rocca
*Assistant Examiner* — Julia C Tran

(57) ABSTRACT

A cutting deck lifting device for adjusting the height of the cutting deck of a mower includes a cutting deck having at least one cutting blade mounted thereto, a pedal assembly including a pedal switched between locking and unlocking states for adjusting the height of the cutting deck, a connecting assembly connecting the pedal assembly to the cutting deck and an adjusting assembly connected to the pedal assembly for positioning the cutting deck to a position with a desired height when the pedal is switched between locking and unlocking states. The cutting deck lifting device can conveniently and quickly adjust the cutting deck between the first position and the second position. Simultaneously, the cutting deck lifting device has a simple structure, a low manufacturing cost, and easy installation, and can be applied to a variety of garden tools.

15 Claims, 6 Drawing Sheets

CUTTING DECK LIFTING DEVICE AND MOWER HAVING CUTTING DECK LIFTING DEVICE

CROSS-REFERENCE TO RELATED INVENTIONS

The present application is a Continuation Application of U.S. application Ser. No. 17/023,934 filed on Sep. 17, 2020, which claims the priority of CN application Serial No. 201910874473.7, filed on Sep. 17, 2019, the disclosures of which are hereby incorporated by reference in their entirety.

TECHNICAL FIELD

The invention relates to a lifting device for lifting a cutting deck, in particular to a lifting device being suitable for a mower.

BACKGROUND ART

The height of cutting deck is usually adjusted via a lifting device, the operator needs to depress a height adjusting pedal by foot until the height of the deck is adjusted by a hand. The inconvenient operation process easily causes the operator fatigue and affects the safety use of the cutting deck because the operator must simultaneously use hand and foot to adjust the height of the cutting deck.

In view of the above, there is a need to improve a lifting device of the existing mower to solve the above problems.

SUMMARY OF INVENTION

Present invention provides a cutting deck lifting device, the cutting deck lifting device can conveniently and quickly adjust a cutting deck between a first position and a second position; simultaneously, the cutting deck lifting device has a simple structure, a low manufacturing cost, and easy installation and can be applied to a variety of garden tools.

To achieve the above object, the present invention provides a cutting deck lifting device for adjusting the height of the cutting deck of a mower comprising a cutting deck having at least one cutting blade mounted thereto, a pedal assembly including a pedal switched between locking and unlocking states for adjusting the height of the cutting deck, a connecting assembly connecting the pedal assembly to the cutting deck and an adjusting assembly connected to the pedal assembly for positioning the cutting deck to a position with a desired height when the pedal is switched between locking and unlocking states.

As a further improvement of the invention, the cutting deck is in a first position when the pedal is in locking state, and wherein the cutting deck is in a second position when the pedal is in unlocking state, and wherein the height of the cutting deck is adjusted when the cutting deck is in the second position.

As a further improvement of the invention, the cutting deck has different heights when in different second positions, and wherein the height of the cutting deck is adjusted when the cutting deck is lifted between the first position and the second position, and wherein the cutting deck is lifted between the first position and the second position when the pedal is switched between the locking state and the unlocking state.

As a further improvement of the invention, the adjusting assembly includes a sliding plate rotatably connected to the pedal and a positioning member abutting against the sliding plate to position the cutting deck to the position with the desired height, and wherein the desired height is determined when the pedal is in locking state.

As a further improvement of the invention, the sliding plate slides away from the positioning member when the pedal is switched from the unlocking state to the locking state, and wherein the sliding plate slides towards the positioning member and abuts against the positioning member when the pedal is switched from the locking state to the unlocking state.

As a further improvement of the invention, the sliding plate slides away from the positioning member when the cutting deck is lifted from the second position to the first position, and wherein the sliding plate slides towards the positioning member and abuts against the positioning member when the cutting deck is lifted from the first position to the second position.

As a further improvement of the invention, the adjusting assembly includes an adjusting plate corresponding to the sliding plate, and wherein the sliding plate slides forwardly along the adjusting plate to separate from the positioning member, and wherein the sliding plated slides backwardly along the adjusting plate to abut against the positioning member.

As a further improvement of the invention, the positioning member is detachably connected to the adjusting plate, and wherein the adjusting plate has a plurality of adjusting holes for allowing the positioning membered inserting thereinto.

As a further improvement of the invention, each adjusting hole is provided with a limiting slot, and wherein the positioning member has a limiting protrusion corresponding to the limiting slot, and wherein the limiting protrusion engages with the limiting slot for preventing the rotating between the positioning member and the adjusting hole.

As a further improvement of the invention, the pedal assembly includes a locking mechanism corresponding to the pedal, and wherein the pedal is locked with the locking mechanism when in the locking state, and wherein the pedal is unlocked with the locking mechanism when in unlocking state.

As a further improvement of the invention, the pedal has a retaining portion, and wherein the locking mechanism has a locking protrusion corresponding to the retaining portion, and wherein the retaining portion engages with the locking protrusion to lock the pedal assembly with the locking mechanism when the pedal is in locking state, and wherein the retaining portion disengages with the locking protrusion to unlock the pedal assembly with the locking mechanism when the pedal is in unlocking state.

As a further improvement of the invention, the pedal includes a pedal body and a bracket connecting the pedal body to the connecting assembly, and wherein the retaining portion is disposed on the pedal body.

As a further improvement of the invention, the pedal includes a rotating shaft for rotatably connecting the pedal body to the bracket, and wherein the sliding plate is rotatably connected to the bracket, and wherein the pedal body and the sliding plate are located at two opposite ends of the bracket, and wherein the rotating shaft and the retaining portion are located at two opposite ends of the pedal body.

As a further improvement of the invention, the pedal assembly also includes a resetting spring located between the pedal body and the bracket for returning the pedal body to an original position when the force applied to the pedal body is withdrawn.

As a further improvement of the invention, the bracket has a limiting arm for abutting against the pedal body to limit the rotatable angle of the pedal body, and wherein the pedal body is rotatably mounted to the limiting arm through the rotating shaft.

As a further improvement of the invention, the resetting spring is sleeved on the rotating shaft, and wherein the limiting arm defines a guiding surface for allowing the pedal body to rotate along the axis of the rotating shaft.

As a further improvement of the invention, the connecting assembly includes a lateral rotating shaft and at least one connecting mechanism mounted on the lateral rotating shaft for fixedly connecting the cutting deck to the rotating shaft, and wherein the pedal is fixedly connected to one end of the lateral rotating shaft through the bracket, and wherein the lateral rotating shaft is driven to rotate to lift the cutting deck in a vertical direction when the pedal is stepped to drive the bracket to rotate.

As a further improvement of the invention, the connecting assembly is driven to rotate to lift the cutting deck in a vertical direction when the pedal is stepped.

To achieve the above object, the present invention also provides a mower comprising a base having wheels mounted thereto, a controlling device connected to the base for controlling the movement of the mower, a cutting deck connected to the base and having at least one cutting blade mounted thereto and a cutting deck lifting device coupled to the base for adjusting a height of the cutting deck including a pedal assembly having a pedal switched between locking and unlocking states for adjusting the height of the cutting deck, a connecting assembly connecting the pedal assembly to the cutting deck and an adjusting assembly connected to the pedal assembly for positioning the cutting deck to a position with a desired height when the pedal is switched between locking and unlocking states.

To achieve the above object, the present invention also provides a mower comprising a base having wheels mounted thereto, a controlling device connected to the base for controlling the movement of the mower, a cutting deck connected to the base and having at least one cutting blade mounted thereto and a cutting deck lifting device for adjusting a height of the cutting deck including a pedal assembly having a pedal mounted to the base and being switched between locking and unlocking states, a connecting assembly connecting the pedal assembly to the cutting deck and driven to rotate to lift the cutting deck in a vertical direction when the pedal is stepped between the locking and unlocking states, and an adjusting assembly connecting the pedal assembly to the base for positioning the cutting deck to a position with a desired height after the cutting deck is lifted.

The above general description and the following detailed description are intended to be illustrative and not restrictive.

DESCRIPTION OF EMBODIMENT

The exemplary embodiment will be described in detail herein, and the embodiment is illustrated in the accompanying drawings. When the following description refers to the drawings, unless otherwise indicated, the same numbers in different drawings indicate the same or similar elements. The embodiment described in the following exemplary embodiment does not represent all embodiments consistent with present invention. On the contrary, they are only examples of devices, systems, machines and methods consistent with some aspects of the invention as detailed in the appended claims.

Figure 1:
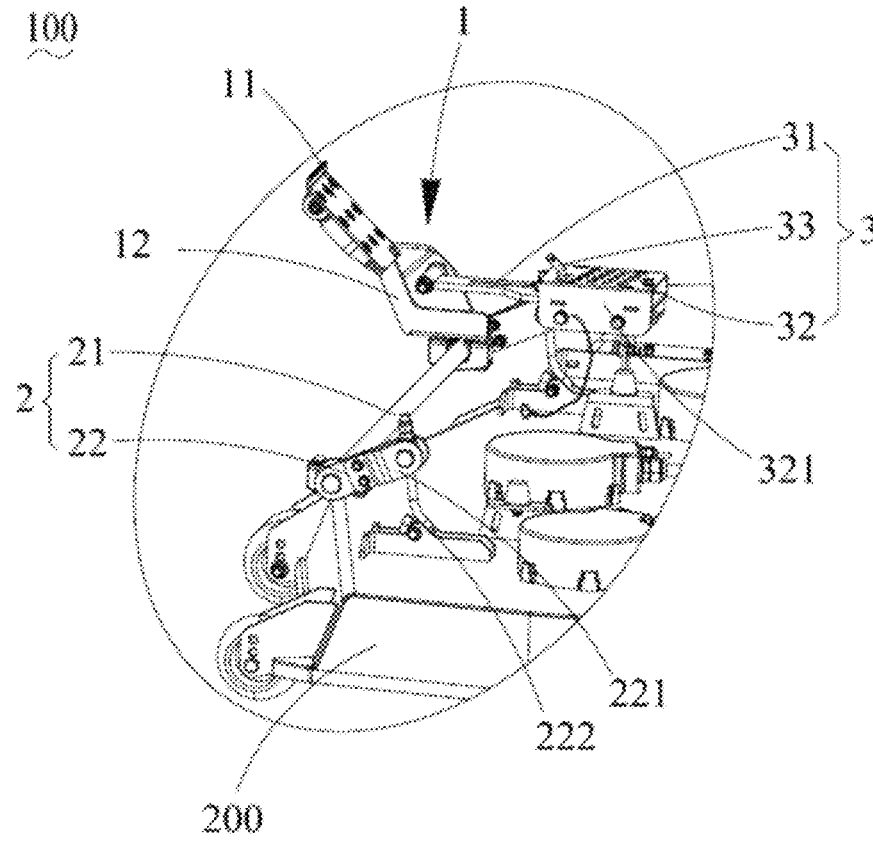
FIG. 1 is a partial perspective view of a cutting deck lifting device of a mower in accordance with one embodiment of the present invention.

Referring to FIG. 1, a cutting deck lifting device 100 used for a mower 300 according to present invention has a pedal assembly 1, a cutting deck 200, a connecting assembly 2 for connecting the pedal assembly 1 to the cutting deck 200 and an adjusting assembly 3 connected to the pedal assembly 1 for adjusting the height of the cutting deck 200.

Figure 2:
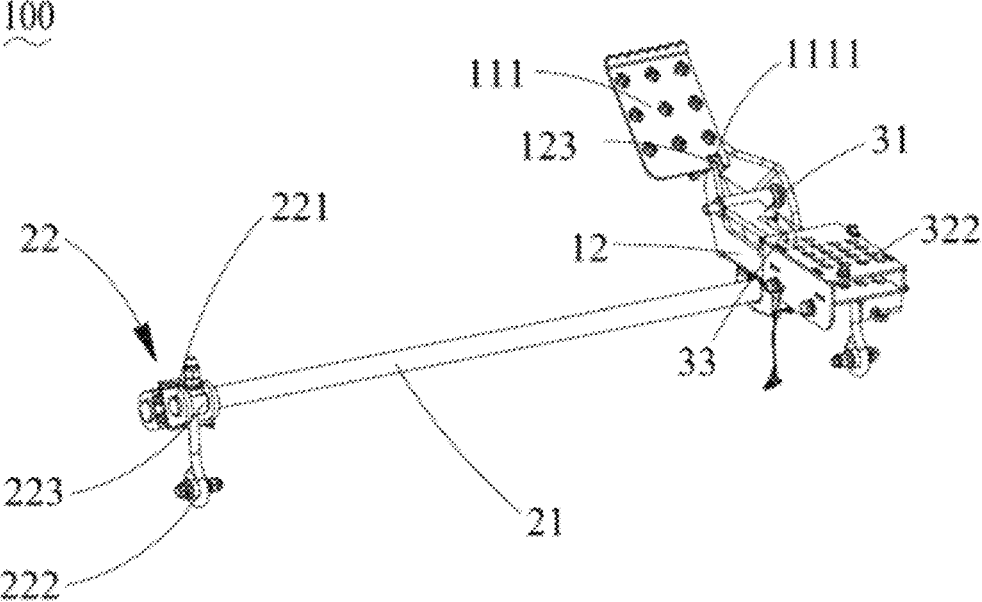
FIG. 2 is a perspective view of the cutting deck lifting device shown in FIG. 1.
Figure 3:
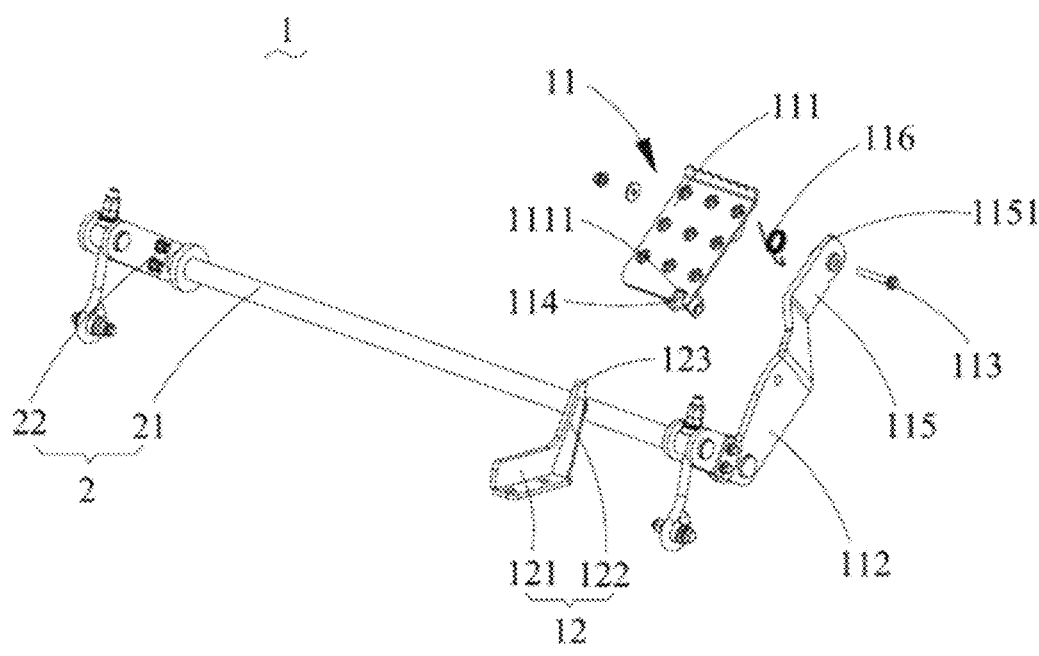
FIG. 3 is another perspective view of the cutting deck lifting device of FIG. 2.

Referring to FIG. 1 to FIG. 3, the pedal assembly 1 includes a pedal 11 and a locking mechanism 12 mounted to the mower 300 for engaging with the pedal 11 to lock the pedal 11 in a locking position. The pedal 11 has a pedal body 111 and a bracket 112 connecting the pedal body 111 to the connecting assembly 2. The pedal body 111 is rotatably mounted to an end of the bracket 112 through a rotating shaft 113. The pedal 11 has a retaining portion 114 corresponding to the locking mechanism 12. The retaining portion 114 is located at one end of the pedal body 111. The rotating shaft 113 and the retaining portion 114 are respectively located at two opposite ends of the pedal body 111. The retaining portion 114 is separated from the pedal body 111 and the pedal body 111 has a groove 1111 corresponding to the retaining portion 114. The groove 1111 is formed by inwardly recessing the edge of the pedal body 111. In other embodiment, the retaining portion 114 is integrally formed with the pedal body 111 when the pedal 11 is stably locked with the locking mechanism 12.

The bracket 112 has a limiting arm 115 for limiting the rotatable angle of the pedal body 111. The pedal body 111 is rotatably mounted to one end of the limiting arm 115 through the rotating shaft 113 and abuts against the limiting arm 115 when depressed forwardly by the operator. The limiting arm 115 has an inclined guiding surface 1151 located at one end thereof for allowing the pedal body 111 to rotate along the axis of the rotating shaft 113. A resetting spring 116 is sleeved on the rotating shaft 13 and mounted between the pedal body 111 and the limiting arm 115 of the bracket 112 for returning the pedal body 111 to the original position when the pedal body 111 is not depressed.

An angle $\alpha$ is formed between an extending direction of the limiting arm 115 and the inclined guiding surface 1151. The angle $\alpha$ is the maximum rotatable angle of the pedal body 111 when being depressed to rotate around the rotating shaft 113. The bottom of the pedal body 111 abuts against the inclined guiding surface 1151 when the pedal body 111 rotates the angle $\alpha$. In some embodiments of present invention, the angle $\alpha$ is within a range between 0 and 90°. In some embodiments of the present invention, the angle $\alpha$ is within a range between 0 and 80°. In some embodiments of the present invention, the angle α is within a range between 0 and 70°. In some embodiments of the present invention, the angle α is within a range between 0 and 60°. In some embodiments of the present invention, the angle α is within a range between 0 and 50°. In some embodiments of the present invention, the angle α is within a range between 0 and 40°. In some embodiments of the present invention, the angle α is within a range between 0 and 30°. In some embodiments of the present invention, the angle α is within a range between 0 and 20°. In some embodiments of the present invention, the angle α is 12°. In some embodiments of the present invention, the angle α is within a range between 0 and 10°.

The locking mechanism 12 has a mounting portion 121 and an extending portion 122 extending upwardly from the mounting portion 121. The extending portion 122 is provided with a locking protrusion 123 corresponding to the retaining portion 114. When the pedal 11 is located at the locking position, the locking protrusion 123 passes through the groove 1111 and engages with the retaining portion 114 to prevent the pedal 11 from rotating backwardly, so as to limit the position of the pedal 11.

The cutting deck 200 is connected with the pedal assembly 1 through the connecting assembly 2. The cutting deck 200 is lifted by the pedal assembly 1 through connecting assembly 2. Specifically, the cutting deck 200 is in a first position when the pedal 11 is locked in the lock position by the lock mechanism 12, and the cutting deck 200 is in a second position when the pedal 11 is separated from the locking mechanism 12. The pedal 11 can lift the cutting deck 200 in a vertical direction between the first position and the second position through the connecting assembly 2.

In present invention, the connecting assembly 2 includes a lateral rotating shaft 21 and two connecting mechanisms 22 connected to two ends of the lateral rotating shaft 21. The pedal 11 is fixedly connected to one end of the lateral rotating shaft 21 through the bracket 112. The lateral rotating shaft 21 is driven to rotate by the pedal 11 when the pedal 11 is depressed by the operator, and the connecting mechanisms 22 are driven to move upwardly in the vertical direction by the lateral rotating shaft 21.

Furthermore, each connecting mechanism 22 has a fixing portion 221 for fixedly connecting the connecting mechanism 22 to the lateral rotating shaft 21 and a connecting rod 222 rotatably connected to the fixing portion 221. In a preferred embodiment of present invention, the fixing portion 221 is a pair of U-shaped clamping plates. The connecting rod 222 has one end rotatably sandwiched between the clamping plates by a connecting shaft 223 and the other end connected to the cutting deck 200. The connecting rod 222 can be easy to replace due to being sandwiched between the clamping plates 221. The cutting deck 200 is driven to lift through the fixing portion 221 driving the connecting rod 222 to lift when the lateral rotating shaft 21 rotates.

Of course, in other embodiments of present invention, the fixing portion 221 may also be another structure for connecting the connecting rod 222 with the lateral rotating shaft 21, the connecting rod 222 may also be replaced by another structure for connecting the fixing portion 221 with the cutting deck 200, when the stable connection between the connecting rod 222 and the connecting shaft 223 and the stable connection the fixing portion 221 and the cutting deck 200 are ensured.

Figure 4:
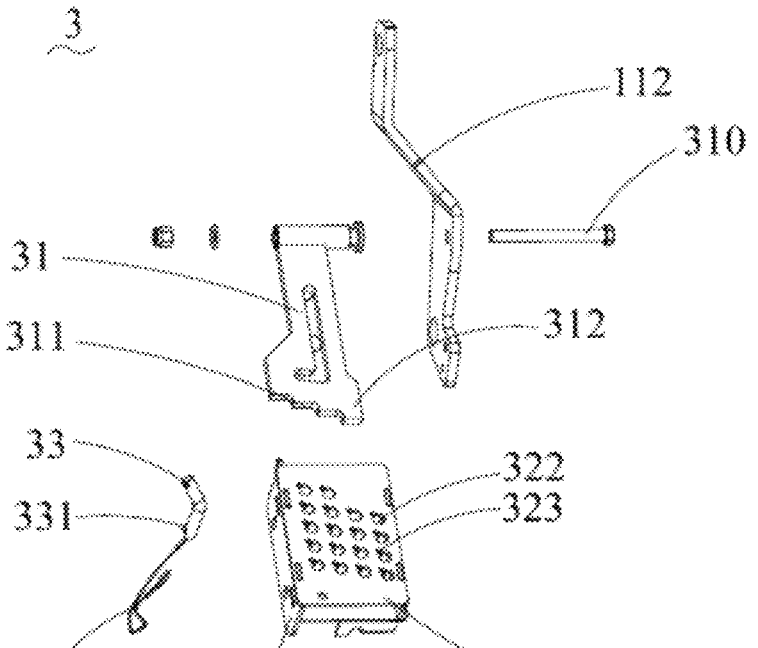
FIG. 4 is an exploded view of an adjusting assembly of the cutting deck lifting device shown in FIG. 2.
Figure 5A:
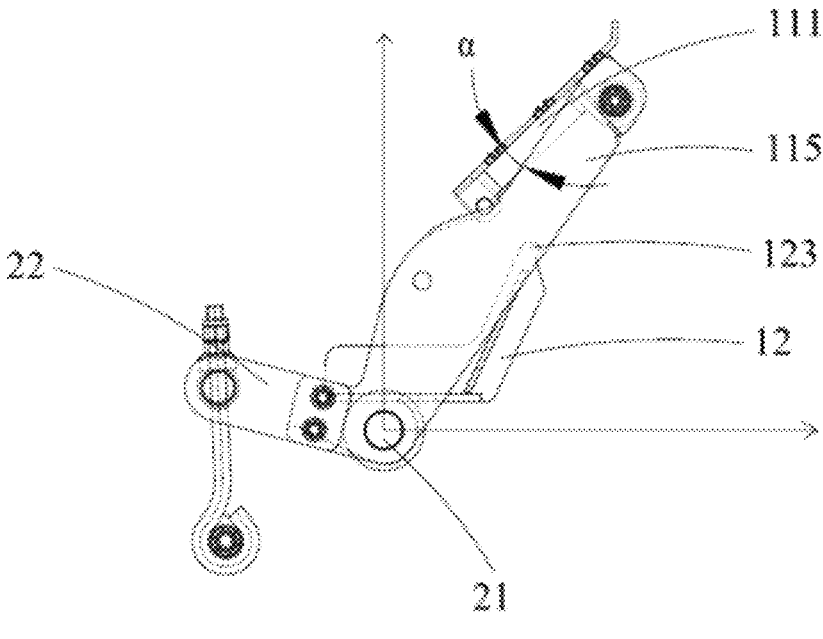
FIG. 5a to FIG. 5e are schematic view illustrating a pedal assembly engaging with a locking mechanism shown in FIG. 2.
Figure 5B:
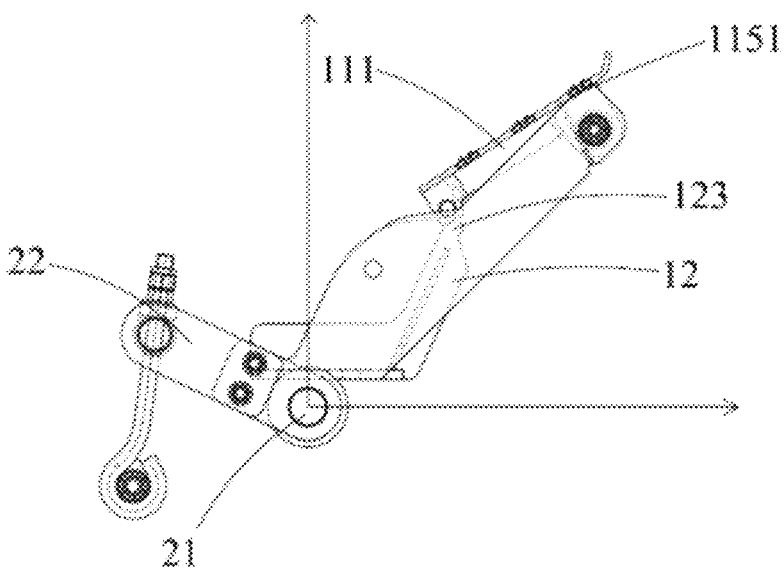
Figure 5C:
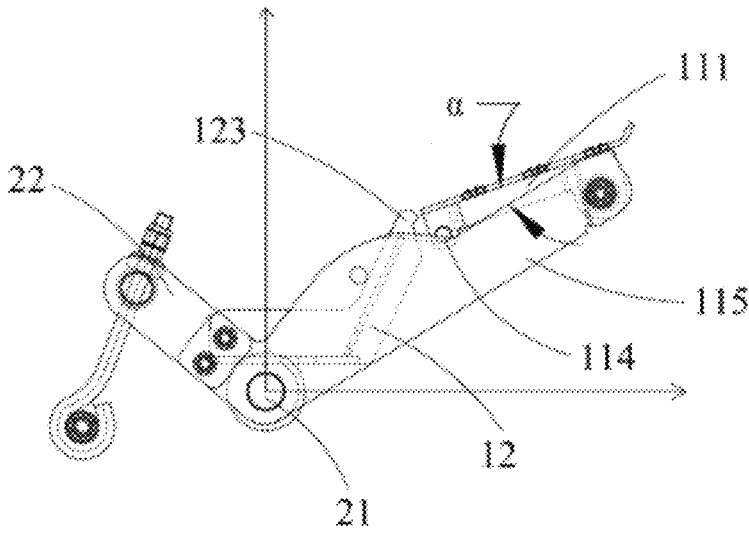
Figure 5D:
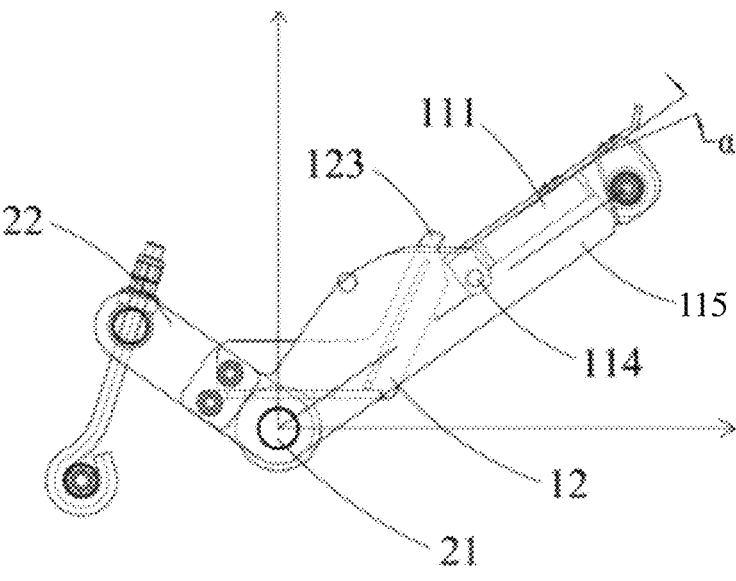
Figure 5E:
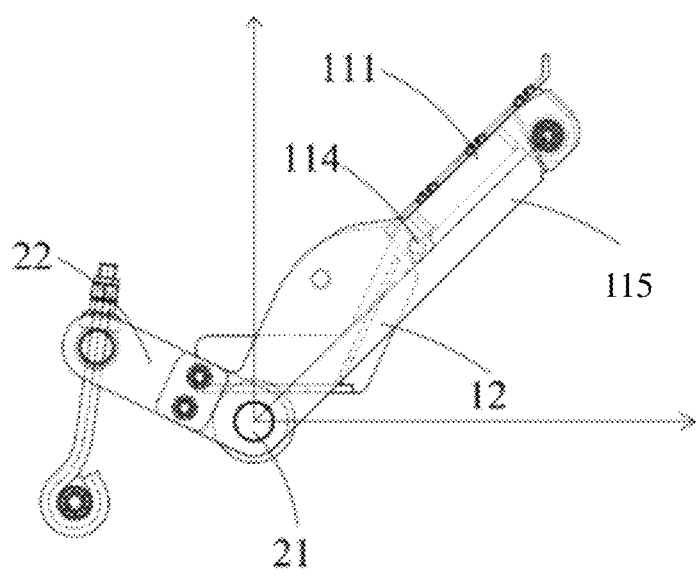

Referring to FIG. 1, 2 and FIG. 4, the cutting deck lifting device 100 further has an adjusting assembly 3 connected to the pedal assembly 1. The adjusting assembly 3 configured to adjust the height of the second position of the cutting deck 200 comprises a sliding plate 31 rotatably connected to the bracket 112, an adjusting plate 32 corresponding to the sliding plate 31 and a positioning member 33 detachably connected to the adjusting plate 32. In present invention, the sliding plate 31 has one fixed end (not labeled) rotatably connected to the bracket 112 by a retaining shaft 310 and a free end (not labeled) opposite to the fixed end (not labeled). The sliding plate 31 has an engaging portion 311 located at the free end thereof. The engaging portion 311 is corresponding to the positioning member 33. The adjusting plate 32 has an upper side parallel with the sliding plate 31 and a positioning plate 321 for fixedly mounting the adjusting plate 32 to the base of the mower. The sliding plate 31 can slide back and forth in a horizontal plane relative to the adjusting plate 32 when being driven by the pedal assembly 1. The positioning member 33 is detachably connected to the adjusting plate 32 for locking the sliding plate 31 in a desired position when the retaining portion 114 is unlocked with the locking protrusion 123 of the locking mechanism 12.

Furthermore, the adjusting plate 32 is provided with a plurality of adjusting holes 322 arranged in columns. The engaging portion 311 can abut against the positioning member 33 to limit the relative position between the sliding plate 31 and the adjusting plate 32 when the positioning member 33 is inserted into the adjusting holes 322, so as to limit the height of the second position of the cutting deck 200. The cutting deck 200 drives the fixing portion 221 move upwardly in a vertical direction and drives the lateral rotating shaft 21 to rotate when the working terrain is uneven and the cutting deck 200 is bumped up by the ground or other objects. The lateral rotating shaft 21 further drives the bracket 112 moves forwardly, therefore the sliding plate 31 slides forwardly and away from the positioning member 33. The engaging portion 311 of the sliding plate 31 re-engages with the positioning member 33 to retain the height of the second position of the cutting deck 200 when the cutting deck 200 is in free state. The collision between the cutting deck 200 and the ground or other objects can be effectively prevented and the service life of the cutting deck 200 can be improved.

Preferably, each adjusting hole 322 is provided with a limiting slot 323, and the positioning member 33 is provided with a limiting protrusion 331 at the bottom thereof and corresponding to the limiting slot 323. The limiting protrusion 331 can prevent the positioning member 33 and the adjusting hole 322 from rotating relatively, so as to improve the stable engagement between the engaging portion 311 and the position member 33. Furthermore, a scale is marked beside each adjusting hole 322 to denote the height of the second position of the cutting deck 200 (i.e. the working height of the cutting deck 200), which is convenient for the operator to select and adjust the height of the second position of the cutting deck 200.

In a preferred embodiment of present invention, two adjusting plates 32 are parallelly arranged in a vertical direction. The sliding plate 31 is slidably sandwiched between two adjusting plates 32. The adjusting holes 322 on each adjusting plate 32 are configured in a plurality of columns in front and rear direction and paralleled to each other in different columns. Each column contains different number of adjusting holes 322. In a preferred embodiment of the present invention, the number of the adjusting holes 322 in each column is progressively decreased, furthermore, the adjusting holes 322 on the two adjusting plates 32 are arranged correspondingly to each other in a vertical direction. In this embodiment, the sliding plate 31 is sandwiched between the two adjusting plates 32 and abuts against the positioning member 33 which passed through two adjusting plates 32 simultaneously. Furthermore, the engaging portion 311 is configured as a step shape and has a plurality of step surfaces 312. The number of the step surfaces 312 corresponds to the number of the columns of adjusting holes 322, so as to effectively prevent the positioning member 33 from being deformed when the sliding plate 31 abutting against the positioning member 33 and improve the use safety of the cutting deck lifting device 100. Meanwhile, more options can be provided for the operator to adjust the height of the cutting deck 200 when the stable connection between the sliding plate 31 and the positioning member 33.

In particular, the adjusting assembly 3 further comprises a connecting rope 34, and the positioning member 33 is connected to the adjusting assembly 3 by the connecting rope 34. The positioning member 33 can be prevented falling off or losing from the adjusting assembly 3 by the connecting rope 34, so that the practicability of the cutting deck lifting device 100 is improved.

Referring to FIGS. 5a to 5e, when the cutting deck lifting device 100 of the present invention is installed, the retaining portion 114 of the pedal body 111 is unlocked with the locking protrusion 123 of the locking mechanism 12. Firstly, stepping the front end of the pedal body 111 to drive the pedal body 111 to rotate the angle α around the rotating shaft 113, so as to form a space (not labeled) between the pedal body 111 and the bracket 112 for allowing the locking protrusion 123 of the locking mechanism 12 passing through (referring to FIGS. 5a to 5b). Secondly stepping the front end of the pedal body 111 to drive the bracket 112 to rotate around the lateral rotating shaft 21 (referring to FIG. 5c) until the pedal body 111 transiting the locking protrusion 123 of the locking mechanism 12. Thirdly, stepping the rear end of the pedal body 111 to drive the pedal body 111 to rotate back to the initial position of the pedal body 111 under the force of the resetting spring 116 (referring to FIG. 5d). Finally, decreasing the force applied to the pedal body 111 to make the pedal 11 rotate reversely around the lateral rotating shaft 21 under the gravity of the cutting deck 200 and lock the pedal 11 at the locking position (referring to FIG. 5e) through the locking protrusion 123 of the locking mechanism 12 passing through the groove 1111 of the pedal body 111 and engaging with the retaining portion 114 of the pedal 11. The pedal 11 abuts against the limiting arm 115 when the pedal 11 is in a locking position. Therefore, the cutting deck 200 is retained in the first position (i.e., a maximum working height position). And the sliding plate 31 is located at a farthest position relative to the adjusting plate 32 and does not engage with the positioning member 33. The mower can be transported in this configuration.

When the work height of the cutting deck 200 of the mower (the height of the second position of the cutting deck 200) need to be adjusted during operation, firstly inserting the positioning member 33 into corresponding adjusting hole 322 of the adjusting plate 32. Secondly, downwardly stepping the rear end of the pedal body 111 to rotate an angle around the lateral rotating shaft 21, so as to separate the retaining portion 114 of the pedal 11 from the locking protrusion 123 of the locking mechanism 12. The sliding plate 31 is driven to move forwardly when the pedal body 111 is stepped. Thirdly, stepping downwardly the front end of the pedal body 111 to drive the pedal body 111 to rotate the angle α around the rotating shaft 113, so as to form a space (not labeled) between the pedal body 111 and the bracket 112 for allowing the locking protrusion 123 of the locking mechanism 12 passing through. Finally, decreasing the force applied to the pedal 11 to make the pedal 11 rotate reversely around the lateral rotating shaft 21 under the gravity of the cutting deck 200 until the retaining portion 114 of the pedal 11 transiting the locking protrusion 123 of the locking mechanism 12, so as to drive the sliding plate 31 to slide backwardly along two adjusting plates 32 until the engaging portion 311 of the sliding plate 31 abuts against the positioning member 33. Therefore, the cutting deck 200 is positioned in a second position with a desired height. The cutting deck 200 is adjusted from the first position to the second position.

The height of the cutting deck 200 when the cutting deck 200 is in the second position can be adjusted through repeating the steps described above. The height of the cutting deck 200 can be adjusted between the first position and the second position through the engagement between the pedal 11 and the locking mechanism 12 and the engagement among the sliding plate 31, the adjusting plate 32 and the positioning member 33 of the adjusting assembly 3.

In present invention, the cutting deck lifting device 100 further comprises a plurality of assisting component 4 connected to the lateral rotating shaft 21. The assisting component 4 and the pedal 11 are respectively arranged at two sides of the lateral rotating shaft 21 in a front-rear direction. The assisting component 4 is in a stretching state for assisting the pedal 11 to drive the lateral rotating shaft 21 to rotate when the pedal 11 is stepped. Therefore, the cutting deck 200 is conveniently adjusted between the first position and the second position by the pedal assembly 1. In some embodiment of the present invention, the assisting component 4 is a spring.

It should be noted that, in the above description, the cutting deck lifting device 100 is provided with one pedal assembly 1, one connecting assembly 2 and one adjusting assembly 3 as an example for illustration. In other embodiment, the cutting deck lifting device 100 may be provided with two connecting assemblies 2 and two adjacent connecting assemblies 2 are connected to each other through an arc-shaped connecting rod 5.

Specifically, when the cutting deck lifting device 100 is provided with two connecting assemblies 2, the connecting assemblies 2 includes a first connecting assembly 2' and a second connecting assembly 2" respectively located at two opposite sides of the cutting deck 200 in a working direction. The first connecting assembly 2' and the second connecting assembly 2" are arranged in parallel. The pedal assembly 1 and the adjusting assembly 3 are connected to the first connecting assembly 2' and located at the same side of a lateral rotating shaft 21' of the first connecting assembly 2' (referring to FIG. 6).

Furthermore, one end of the arc-shaped connecting rod 5 is connected to the first connecting assembly 2' or the pedal assembly 1, and the other end of the connecting rod 5 is connected to the second connecting assembly 2". Preferably, one end of the arc-shaped connecting rod 5 is connected to the bracket 112, and the other end of the connecting rod 5 is connected to the lateral rotating shaft 21" of the second connecting assembly 2". The bracket 112 is rotated to drive the lateral rotating shaft 21' to rotate and simultaneously drives the arc-shaped connecting rod 5 to move forwardly when the pedal body 111 is stepped, so as to drive the lateral rotating shaft 21" of the second connecting assembly 2" to rotate. Therefore, the cutting deck 200 connected to the first connecting assembly 2' and the second connecting assembly 2" can be lifted up and down in the vertical direction and the height of the cutting deck 200 in the second position is also adjustable.

Furthermore, one end of the assisting component 4 in this embodiment is connected to the lateral rotating shaft 21" of the second connecting assembly 2" and the other end of the assisting component 4 is connected to the base of the mower. Preferably, the assisting components 4 are arranged in pairs and symmetrically disposed at two sides of the lateral rotating shaft 21" to ensure that the lateral rotating shaft 21" is uniformly stressed and prevent the lateral rotating shaft 21" from being broken due to uneven stress. The assisting components 4 assist the pedal 11 to drive the lateral rotating shafts 21', 21" to rotate when the height of the cutting deck 200 is desired to be adjusted by the operator.

Figure 7:
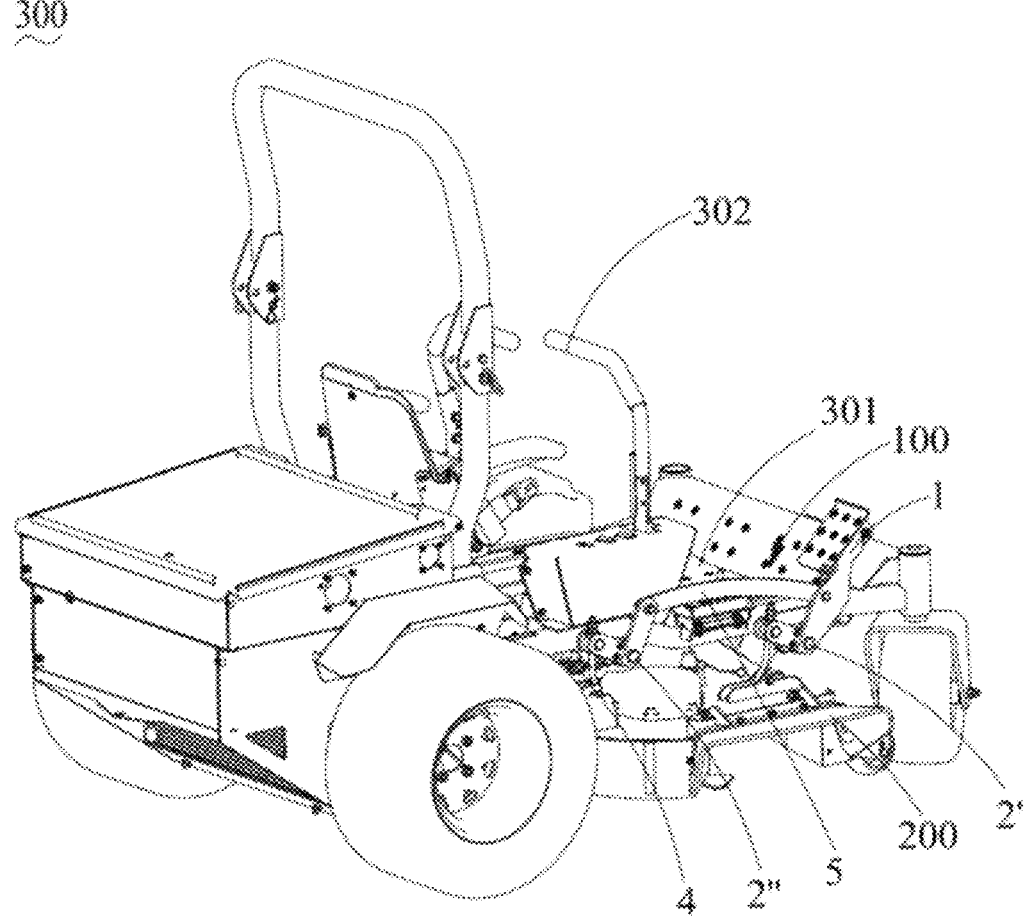
FIG. 7 is a perspective view of a mower in accordance with one embodiment of the present invention, showing the cutting deck is connected to the mower through the lifting device shown in FIG. 6.

Referring to FIG. 7, a mower 300 according to present invention is shown. The mower 300 comprises a base 301 operably coupled to wheel thereof, a controlling device 302 connected to the base 301 for controlling the movement thereof, a cutting deck 200 connected to the base 301 for mounting at least one cutting blade and the cutting deck lifting device 100 for adjusting the height of the cutting deck 200 between the first position and the second position.

Specifically, the locking mechanism 12 is fixedly mounted to the right front region of the base 301 through the mounting portion 121. The adjusting plate 32 is fixedly mounted on the right of the base 301 through the positioning plate 321. The adjusting plate 32 is located at a portion where is easily operated by operator's hand. The pedal assembly 1 is located at the right front region of the base 301 where is easily operated by operator's foot. The locking mechanism 12 is staggered with the adjusting plate 32 when the cutting deck lifting device 100 is installed on the mower 300. The pedal body 111 protrudes from a bottom of the base 301 through the bracket 112 and is located in a front of the mower 300, so as to make the sliding plate 31 connected to the bracket 112 overlap on the adjusting plate 32. The operator can conveniently step the pedal 11 and adjust the height of the cutting deck 100 through inserting the positioning member 33 into corresponding adjusting holes 322 when the cutting deck is in a second position.

Figure 6:
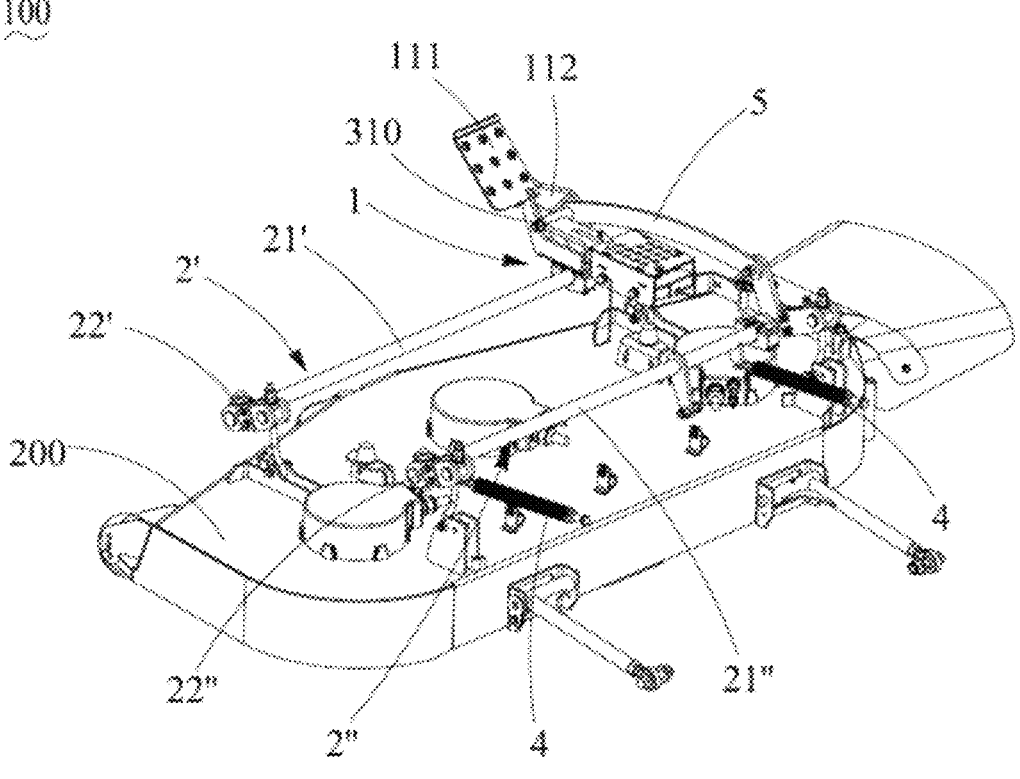
FIG. 6 is a perspective view of a cutting deck lifting device connected to a cutting deck in accordance with another embodiment of present invention.

Preferably, the cutting deck lifting device 100 of the present embodiment comprises a first connecting assembly 2' and a second connecting assembly 2" arranged along a direction vertical to a front-rear direction of the mower 300, and a pair of assisting components 4 (as shown in FIG. 6). One end of the assisting component 4 is detachably connected to the lateral rotating shaft 21", the other end of the assisting component 4 is detachably connected to the base 301, so that the assisting component 4 can be changed according to the size and the weight of cutting deck 200 by the operator. Therefore, the practicality of mower 300 is effectively improved.

It should be noted that, in present invention, the mower 300 is a riding on mower, and the cutting deck 200 is a cutting deck for illustration, but in other embodiments of present invention, the types of the mower 300 and the cutting deck 200 can be selectively changed according to actual situations, i.e., the specific types of the mower 300 and the cutting deck 200 are not limited herein.

In summary, the cutting deck lifting device 100 can lift the cutting deck 200 upwardly and downwardly to adjust the height of the cutting deck 200 through the positioning member 33 being inserted into different adjusting holes 322 and the sliding plate 31 being driven by the pedal 11 to abut against the positioning member 33. Therefore, the cutting deck 200 can move upwardly freely and is prevented from rigid collision with the ground or other objects.

The above embodiment is only used to illustrate present invention and not to limits the technical solutions described in present invention. The understanding of this specification should be based on those skilled in the art, although present invention has been described in detail with reference to the above embodiment. However, those skilled in the art should understand that those skilled in the art can still modify or equivalently replace present invention, and all technical solutions and improvements that do not depart from the spirit and scope of present invention should be within the scope of the claims of the invention.

What is claimed is:

1. A lifting device comprising:
a work assembly;
a drive assembly, switchable between a locked state and an unlocked state;
a connection assembly, connected to said drive assembly and said work assembly, for transmitting an action of said drive assembly to said work assembly;
an adjusting assembly configured between said drive assembly and said connection assembly for linking said adjusting assembly, said drive assembly and said connection assembly to adjust said work assembly to a desired height in a vertical direction when said drive assembly is switched between said locked state and said unlocked state;
wherein simultaneous operation of said drive assembly by hand and foot is not required when the height of said work assembly in the vertical direction is switched from a first position to a second position;
wherein said drive assembly comprises a pedal, said pedal comprising a pedal body, a bracket for attaching said pedal body to said connection assembly, and a rotating shaft for rotatably connecting said pedal body to said bracket;
wherein said bracket has a limiting arm for limiting rotation of said pedal body, said pedal body being rotatably mounted to one end of said limiting arm through said rotating shaft and abutted against said limiting arm when depressed forward by an operator;
wherein said limiting arm is provided at said one end thereof with an inclined guiding surface for allowing said pedal body to rotate about said rotating shaft, and an angle is formed between an extending direction of said limiting arm and said inclined guiding surface, said angle being a maximum rotatable angle of said pedal body.

2. The lifting device according to claim 1, wherein said pedal is switchable between the locked state and the unlocked state, said pedal being coupled to said connection assembly and said adjusting assembly, and said pedal, said connection assembly and said adjusting assembly are linked when said pedal is triggered.

3. The lifting device according to claim 2, wherein when said pedal is in said locked state, said work assembly is in said first position; when said pedal is in said unlocked state, said work assembly is in said second position.

4. The lifting device according to claim 2, wherein said adjusting assembly comprises a positioning member and a sliding plate coupled to said pedal, the relative positional relationship between said sliding plate and said positioning member changes when said pedal is switched between said locked state and said unlocked state.

5. The lifting device according to claim 4, wherein when said pedal is switched from said unlocked state to said locked state, said sliding plate slides away from said positioning member; when said pedal is switched from said locked state to said unlocked state, said sliding plate slides toward and against said positioning member.

6. The lifting device according to claim 4, wherein said sliding plate slides away from said positioning member when said work assembly is switched from said second position to said first position; said sliding plate slides toward and against said positioning member when said work assembly is switched from said first position to said second position.

7. The lifting device according to claim 4, wherein said adjusting assembly further comprises an adjusting plate opposite to said sliding plate, said sliding plate sliding forward along said adjusting plate to separate from said positioning member, and said sliding plate sliding backward along said adjusting plate to be against said positioning member.

8. The lifting device according to claim 7, wherein said positioning member is removably connected to said adjusting plate.

9. The lifting device according to claim 7, wherein said adjusting plate is provided with an adjusting slot matching with said positioning member to house said positioning member.

10. The lifting device according to claim 7, wherein said adjusting plate and said positioning member are configured with a limiting member to define a relative position between said positioning member and said adjusting plate.

11. The lifting device according to claim 2, wherein said drive assembly further comprises a locking mechanism operable to act on said pedal, said pedal being locked by said locking mechanism when in said locked state, and said pedal being unlocked from said locking mechanism when in said unlocked state.

12. The lifting device according to claim 11, wherein said pedal has a retaining portion, and said locking mechanism has a locking protrusion corresponding to said retaining portion, said retaining portion engaging said locking protrusion when said pedal is in said locked state, said locking mechanism locking said pedal, said retaining portion disengaging said locking protrusion when said pedal is in said unlocked state, said locking mechanism being unlocked from said pedal; wherein an edge of said pedal body is provided with a groove, when said pedal is in said locked state, said locking protrusion passes through said groove and engages with said retaining portion.

13. The lifting device according to claim 2, wherein said connection assembly comprises a lateral rotating shaft and a connecting mechanism attached to both ends of the lateral rotating shaft, wherein said connecting mechanism is connected to said work assembly, and wherein said drive assembly is connected to one end of said lateral rotating shaft to drive said work assembly connected to said connecting mechanism to move in the vertical direction while rotating said lateral rotating shaft.

14. The lifting device according to claim 13, further comprises an assisting component, said assisting component being attached to said lateral rotating shaft to assist said drive assembly in driving said lateral rotating shaft to rotate.

15. A garden tool, comprising:

a base;

a cutting deck, attached to said base;

a lifting device, comprises:

a drive assembly, switchable between a locked state and an unlocked state;

a connection assembly, connected to said drive assembly and said cutting deck, for transmitting an action of said drive assembly to said cutting deck;

an adjusting assembly configured between said drive assembly and said connection assembly for linking said adjusting assembly, said drive assembly and said connection assembly to adjust said cutting deck to a desired height in a vertical direction when said drive assembly is switched between said locked state and said unlocked state;

wherein simultaneous operation of said drive assembly by hand and foot is not required when the height of said cutting deck in the vertical direction is switched from a first position to a second position;

wherein said drive assembly comprises a pedal, said pedal comprising a pedal body, a bracket for attaching said pedal body to said connection assembly, and a rotating shaft for rotatably connecting said pedal body to said bracket;

wherein said bracket has a limiting arm for limiting rotation of said pedal body, said pedal body being rotatably mounted to one end of said limiting arm through said rotating shaft and abutted against said limiting arm when depressed forward by an operator;

wherein said limiting arm is provided at said one end thereof with an inclined guiding surface for allowing said pedal body to rotate about said rotating shaft, and an angle is formed between an extending direction of said limiting arm and said inclined guiding surface, said angle being a maximum rotatable angle of said pedal body.

\* \* \* \* \*